United States Patent
Peterson

(10) Patent No.: US 6,870,337 B2
(45) Date of Patent: *Mar. 22, 2005

(54) METHODS AND APPARATUS FOR MAINTAINING SYNCHRONIZATION OF A POLYPHASE MOTOR DURING POWER INTERRUPTIONS

(76) Inventor: William A. Peterson, 2629 Pinebluff Dr., Vestal, NY (US) 13850

( * ) Notice: Subject to any disclaimer, the term of this patent is extended or adjusted under 35 U.S.C. 154(b) by 0 days.

This patent is subject to a terminal disclaimer.

(21) Appl. No.: 10/766,719

(22) Filed: Jan. 27, 2004

(65) Prior Publication Data

US 2004/0189231 A1 Sep. 30, 2004

Related U.S. Application Data

(63) Continuation of application No. 10/233,725, filed on Sep. 3, 2002, now Pat. No. 6,777,898.

(51) Int. Cl.[7] ................................................. H02P 7/00
(52) U.S. Cl. ....................... 318/459; 318/138; 318/254; 318/439; 318/500; 388/923; 388/928.1
(58) Field of Search ................................. 318/254, 439, 318/138, 459, 500; 388/923, 928.1

(56) References Cited

U.S. PATENT DOCUMENTS

| | | | |
|---|---|---|---|
| 3,093,780 A | 6/1963 | LeTourneau | |
| 4,321,478 A | * 3/1982 | Plunkett et al. | 307/47 |
| 4,767,970 A | * 8/1988 | Rodal | 318/375 |
| 5,075,610 A | 12/1991 | Harris | |
| 5,172,036 A | 12/1992 | Cameron | |
| 5,223,772 A | 6/1993 | Carobolante | |
| 5,226,501 A | * 7/1993 | Takata | 180/206 |
| 5,485,064 A | 1/1996 | Arnaud et al. | |
| 5,565,752 A | 10/1996 | Jansen et al. | |
| 5,633,568 A | * 5/1997 | Dunfield | 318/254 |
| 5,789,895 A | * 8/1998 | Lee | 318/811 |
| 5,789,896 A | 8/1998 | Fischer et al. | |
| 5,889,629 A | * 3/1999 | Patton, III | 360/75 |
| 5,929,577 A | 7/1999 | Neidorff et al. | |
| 5,990,643 A | * 11/1999 | Holling et al. | 318/254 |
| 6,194,861 B1 | 2/2001 | Bang | |
| 6,230,496 B1 | 5/2001 | Hofmann et al. | |
| 6,342,769 B1 | * 1/2002 | Birkestrand et al. | 318/139 |

* cited by examiner

Primary Examiner—Rina Duda
(74) Attorney, Agent, or Firm—Kaplan & Gilman, LLP

(57) ABSTRACT

Methods and apparatus permit: monitoring a level of a power source that provides operating power to a control circuit, the control circuit being of a type that senses signals in windings of a polyphase motor to maintain synchronization therewith; and converting kinetic energy of the polyphase motor into operating power for the control circuit when the level has fallen below a threshold level, such that the control circuit is capable of maintaining synchronization with the polyphase motor.

14 Claims, 6 Drawing Sheets

METHODS AND APPARATUS FOR MAINTAINING SYNCHRONIZATION OF A POLYPHASE MOTOR DURING POWER INTERRUPTIONS

CROSS REFERENCE TO RELATED APPLICATIONS

This application in a continuation application under 37 C.F.R. §1.53(b) and claims the benefits under 35 U.S.C. §120 to U.S. patent application Ser. No. 10,233,725, filed Sep. 3, 2002, now U.S. Pat. No. 6,777,898 now allowed, the entire disclosure of which is hereby incorporated by reference.

BACKGROUND OF THE INVENTION

The present invention relates to methods and apparatus for maintaining synchronization between a control circuit and a rotor of a polyphase motor during power interruptions, particularly when rotor position sensors are not employed in the control and drive of the polyphase motor.

Polyphase AC motors, such as permanent magnet, synchronous machines must be driven such that the windings thereof are energized as a function of the rotor position (and, thus, the rotor flux) in order to obtain driving torque from the machine. Conventionally, the rotor position is obtained by way of one or more rotor position sensors within the polyphase motor assembly, which sensors provide signals indicative of the rotor position to a control circuit.

The material and labor costs associated with employing position sensors within the polyphase motor assembly are undesirable and, therefore, techniques have been developed that permit proper energization of the windings of a polyphase motor without using position sensors. Some of these techniques are discussed in, for example, U.S. Pat. Nos. 5,565,752; and 5,929,577, the entire disclosures of which are hereby incorporated by reference.

Control and drive techniques that do not require position sensors share a common characteristic, namely, that the rotor position of the polyphase motor is unknown at startup. In order to deal with the unknown rotor position, these techniques employ an open-loop acceleration process where the windings of the polyphase motor are driven without synchronization with the rotor position until the motor reaches a threshold rotational speed. At this speed, the polyphase motor generates signals of sufficient magnitudes to provide an indication of the rotor position. Among the signals that may be indicative of the rotor position are the back electromotive force (BEMF) voltages of the windings, the winding currents, etc.

Reference is now made to FIG. 1, which illustrates a block diagram of a conventional system 10 for controlling and driving a polyphase motor 18, which system measures the BEMF voltages of the polyphase motor 18 to determine rotor position. The system 10 includes a DC source 12, a control circuit 14, a driver circuit 16, and the polyphase motor 18. The DC source 12 produces a voltage, VDC, with respect to ground, which is utilized to provide an operating DC voltage, VCC, to the control circuit 14 and to provide a DC bus voltage, VBUS, to the driver circuit 16. The control circuit 14 provides commutation control signals to the driver circuit 16 such that the driver circuit 16 can properly energize the windings of the motor 18. The windings of the motor 18 (which are typically in the standard wye configuration, but which may also be in the delta configuration) are coupled to the driver circuit 16 by way of nodes A, B, and C. The driver circuit 16 provides various current paths among these nodes, the DC bus, and ground in order to drive the polyphase motor 18. The control circuit 14 monitors the voltages at nodes A, B, and C, such as the BEMF voltages, and utilizes same to maintain synchronization with the rotor position of the polyphase motor 18.

Unfortunately, the conventional techniques of monitoring signals indicative of rotor position (such as the BEMF voltages) cannot maintain synchronization with the polyphase motor 18 in the event of a power interruption, even if the power interruption is only momentary and the motor 18 has not stopped turning. This is so because during the power interruption the control circuit 14 is de-energized and looses all synchronization information. This is best seen in FIG. 2, which is a graphical representation of the characteristics of the voltage at node A, the DC bus voltage, and the DC source voltage during a power interruption. At time t0, a power interruption occurs and the DC source voltage, VDC, falls from about 24 volts to about 0 volts. Assuming that there is some impedance between the DC source 12 and the DC bus, the DC bus voltage, VBUS, (and VCC) falls after t0 as a function of the speed of the polyphase motor 18, which is decelerating. Likewise, the voltage at node A falls as a function of the slowing rotational speed of the polyphase motor 18. When the operating DC voltage, VCC, has fallen below, for example, about 15 volts, the control circuit 14 ceases to function properly and loses synchronization with the rotor position of the polyphase motor 18.

When power is restored, resynchronization of the control circuit 14 to the rotor position must be established in order to properly commutate the windings of the polyphase motor 18. Among the conventional processes for reestablishing synchronization is permitting the polyphase motor 18 to stop rotating and restarting the polyphase_motor 18 utilizing the open-loop acceleration process discussed above. This technique may be unsatisfactory for various reasons, including the delays associated with stopping and restarting the polyphase motor 18, which are exacerbated when the inertias of the motor load and/or the rotor itself are large.

Other techniques have been developed for reestablishing synchronization between the control circuit and the rotor position, which techniques are set out in detail in U.S. Pat. Nos. 5,223,772; 5,172,036; and 6,194,861, the entire disclosures of which are hereby incorporated by reference. These conventional techniques, however, all presuppose that synchronization has been lost and must be reestablished using some specialized process. The manifest disadvantage of these techniques, therefore, is the reactive approach that they take to the loss of synchronization. Indeed, they do not address the root problem: the loss of synchronization itself.

Accordingly, there are needs in the art of new methods and apparatus for maintaining synchronization between a control circuit and a rotor of a polyphase motor during power interruptions, so long as the motor is rotating.

SUMMARY OF THE INVENTION

In accordance with one or more aspects of the present invention, a method includes: monitoring a level of a power source that provides operating power to a control circuit, the control circuit being of a type that senses signals in windings of a polyphase motor to maintain synchronization therewith; and converting kinetic energy of the polyphase motor into operating power for the control circuit when the level has fallen below a threshold level, such that the control circuit is capable of maintaining synchronization with the polyphase motor.

The signals in the windings of the polyphase motor may be back electromotive force (BEMF) signals that are used by the control circuit to determine a rotor position of the polyphase motor. Preferably, the BEMF voltage is used to produce the operating power for the control circuit. For example, the BEMF voltage may be boosted to produce the operating power for the control circuit.

The control circuit is preferably operable to provide commutation signals to a driver circuit for commutating the windings of the polyphase motor such that it produces motoring torque during a motoring mode. The method preferably further includes: inhibiting the motoring commutation control signals to the driver circuit in order to convert the kinetic energy of the polyphase motor into operating power for the control circuit.

Preferably, the method further includes enabling the motoring commutation control signals to the driver circuit when the level rises sufficiently with respect to the threshold, wherein the step of enabling may be carried out without first stopping and restarting the polyphase motor.

In accordance with one or more further aspects of the present invention, an apparatus includes: a voltage sensing circuit operable to monitor a level of a power source that provides operating power to a control circuit, the control circuit being of a type that senses signals in windings of a polyphase motor to maintain synchronization therewith; and a power conditioning circuit operable to convert kinetic energy of the polyphase motor into operating power for the control circuit when the level has fallen below a threshold level, such that the control circuit is capable of maintaining synchronization with the polyphase motor.

The power conditioning circuit is preferably operable to use the BEMF voltage to produce the operating power for the control circuit. For example, the power conditioning circuit may be operable to boost the BEMF voltage to produce the operating power for the control circuit.

The apparatus preferably further includes a voltage regulator circuit operable to provide signaling to the power conditioning circuit to regulate the operating power to the control circuit such that the control circuit is capable of maintaining synchronization with the polyphase motor.

The control circuit is preferably operable to provide commutation signals to a driver circuit for commutating the windings of the polyphase motor such that it produces motoring torque during a motoring mode. At least one of the voltage sensing circuit and the power conditioning circuit is operable to inhibit the commutation control signals to the driver circuit in order to convert the kinetic energy of the polyphase motor into operating power for the control circuit. At least one of the voltage sensing circuit and the power conditioning circuit is operable to enable the commutation control signals to the driver circuit when the level rises sufficiently with respect to the threshold, and such that the enabling may be carried out without first stopping and restarting the polyphase motor.

Other advantages, features, and aspects of the invention will be apparent to one skilled in the art in view of the discussion herein taken in conjunction with accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 3:
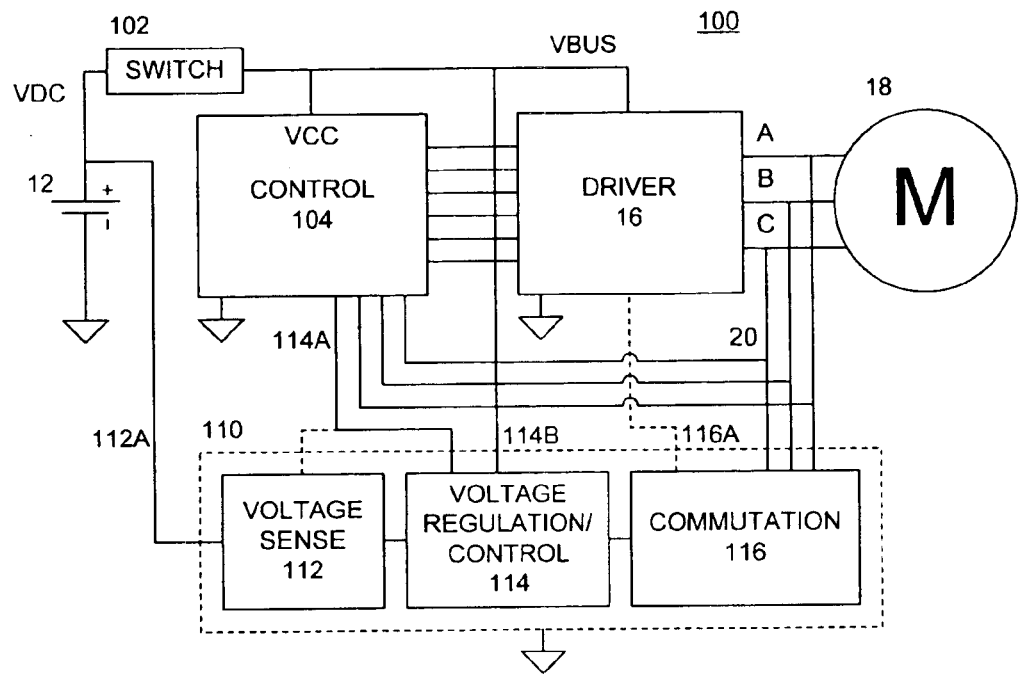
FIG. 3 is a block diagram illustrating a system for controlling and driving a polyphase motor in accordance with one or more aspects of the present invention.

Referring now to the drawings, wherein like numerals indicate like elements, there is shown in FIG. 3 a block diagram illustrating one or more aspects of the present invention. For the purposes of brevity and clarity, the block diagram of FIG. 3 will be referred to, and described herein, as illustrating a system 100, it being understood, however, that the description may be readily applied to various aspects of one or more methods of the present invention with equal force. The system 100 preferably includes a DC source 12, a switch 102, a control circuit 104, a driver circuit 16, and a power interrupt (or ride-through) circuit 110, which all cooperate to commutate the windings of a polyphase motor 18.

It is noted that the polyphase motor 18 may be a permanent magnet (PM) machine, such as a polyphase AC motor, a brushless DC motor, etc., or an induction machine. The illustrative embodiments described herein were subject to experimentation and/or testing in connection with a brushless DC polyphase motor 18. It is understood, however, that skilled artisans can easily apply the details of these illustrative embodiments in connection with other types of machines.

The DC source produces a voltage, VDC, that is input to the switch 102. The switch 102 is preferably operable to disconnect the DC source 12 from the control circuit 104 and the driver circuit 16 under certain conditions, such as during a power interruption. The switch 102 may be implemented utilizing any of the known techniques, such as by way of one or more diodes, one or more transistors, one or more relays, etc. In normal operation, however, the switch 102 permits the DC source 12 to provide an operating DC voltage, VCC, to the control circuit 104 and to provide a DC bus voltage, VBUS, to the driver circuit 16.

The invention contemplates that the normal voltage level of the DC source 12 may take on any value. When the voltage level of the DC source 12 is relatively low, such as 24 volts, the DC source 12 may directly provide the operating DC voltage to the control circuit 104, as is shown in FIG. 3. When the voltage level of the DC source 12 is higher than the maximum voltage rating for the operating DC voltage level of the control circuit 104, however, an additional voltage regulating device (not shown) may be necessary between the DC source 12 and the control circuit 104 to provide the operating DC voltage.

During a motoring mode of operation, the control circuit 104 is operable to provide commutation control signals to the driver circuit 16 such that the windings of the polyphase motor 18 are commutated in a way that causes the motor 18 to produce motoring torque. The control circuit 104 monitors signals of the windings (i.e., at nodes A, B, and C) in order to establish synchronization with the rotor position of the polyphase motor 18 and to issue proper commutation control signals to the driver circuit 16. Any of the known techniques for monitoring such signals may be employed, for example, monitoring BEMF voltages, monitoring current levels in the windings, etc.

The power interrupt circuit 110 is coupled to various nodes of the system 100 in order to permit the control circuit 104 to maintain synchronization with the rotor position of the polyphase motor 18 during a power interrupt condition. Although the invention is not limited by any theory of operation, it is preferred that a power interrupt condition exists when the voltage level of the DC source 12, VDC, reaches or falls below a threshold. It is noted, however, that other indicators of a power interrupt may exist, such as a low voltage level on VCC, VBUS, or some other node. More particularly, the power interrupt circuit 110 permits the conversion of kinetic energy of the polyphase motor 18 (i.e., the energy associated with the rotational inertia of the rotor and load) into a secondary DC source during a power interrupt. The power interrupt circuit 110 also permits the system 100 to regulate the voltage level of this secondary DC source such that it is operable to provide the operating DC voltage, VCC, to the control circuit 104 in a way that the control circuit 104 is capable of maintaining synchronization with the rotor of the polyphase motor 18.

Figure 4:
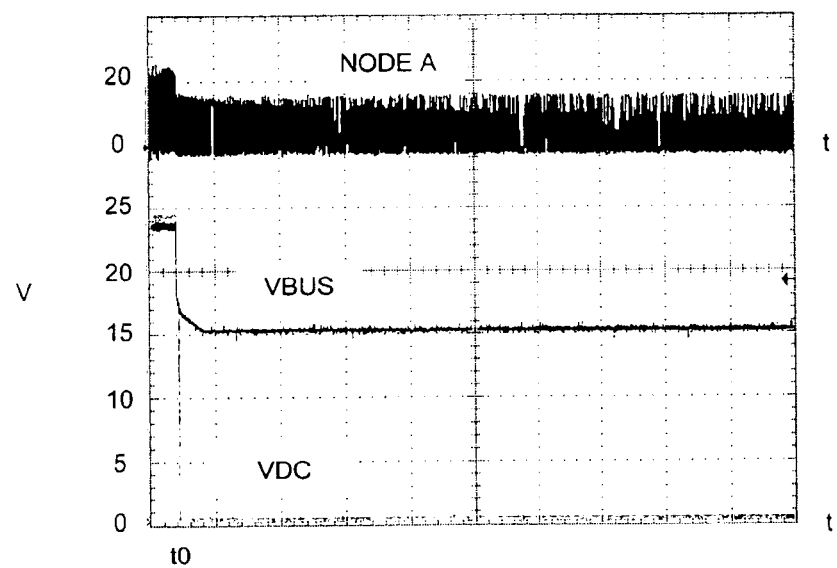
FIG. 4 is a graphical representation of certain voltages in the system of FIG. 3 under power interrupt conditions.

To this end, the power interrupt circuit 110 preferably includes a voltage sensing circuit 112, a voltage regulation and control circuit 114, and a commutation circuit 116. The voltage sensing circuit 112 is preferably operable to monitor a voltage level of the DC source 12 by way of signaling on line 112A and determining whether that level has reached (or fallen below) a threshold. Reference is now made to FIG. 4, which is a graphical representation of various signals of the system 100. (It is noted that FIG. 4 represents actual test data of an illustrative embodiment of the invention.) The voltage sensing circuit 112 is preferably operable to detect that the voltage level of the DC source 12, VDC, has fallen below a threshold at time t0. The voltage sensing circuit 112 preferably provides signaling to at least one of the voltage regulation and control circuit 114 and the control circuit 104, indicating that a loss of power condition exists.

As it is undesirable for the control circuit 104 to provide commutation signaling to the driver circuit 16 during the power interrupt, at least one of the voltage sensing circuit 112 and the voltage regulation and control circuit 114 preferably provide a disabling signal via line 114A to the control circuit 104 during the power interrupt. By way of example, the control circuit 104 may include suitable digital logic circuitry (or analog circuitry), either internally or externally, which interrupts the commutation signaling to the driver circuit 16 in response to the disabling signal on line 114A. Any of the known circuit techniques may be employed to implement such digital logic and/or analog circuitry.

Figure 1:
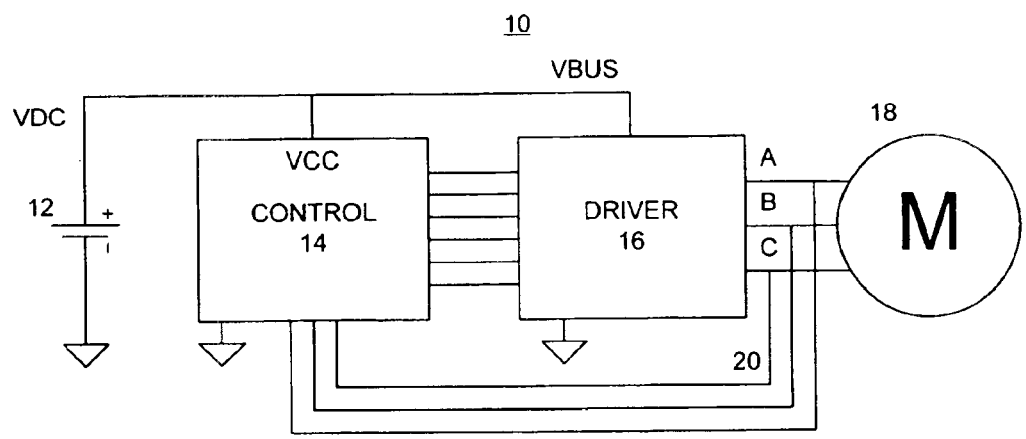
FIG. 1 is a conceptual block diagram illustrating a conventional technique for controlling and driving a polyphase motor.
Figure 2:
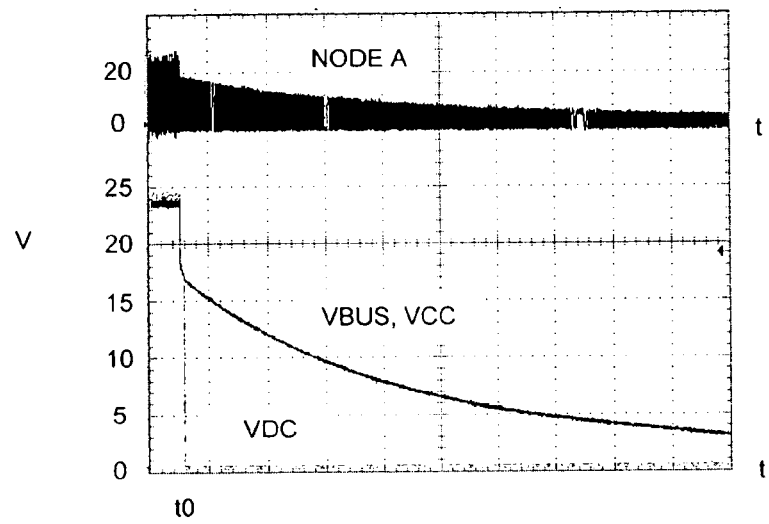
FIG. 2 is a graphical representation of certain voltages in the block diagram of FIG. 1 under power interrupt conditions.

The voltage regulation and control circuit 114 and the commutation circuit 116 preferably performs a voltage boost function and a voltage regulator function in order to convert the kinetic energy of the polyphase motor 18 into a secondary DC source capable of providing the operating DC voltage, VCC, to the control circuit 104 during the power interrupt. More particularly, the boost function boosts the BEMF voltage of the windings of the polyphase motor 18 in a manner dictated by the voltage regulation and control circuit 114 to produce the secondary DC source. The voltage regulation and control circuit 114 ensures that the voltage level of the secondary DC source, e.g., on VBUS, is well regulated by sensing VBUS via line 114B. This is shown in FIG. 4, whereby the voltage level of VBUS (and, therefore, VCC) is regulated to, for example, 15 volts during the power interrupt. (This is in sharp contrast to permitting the bus voltage, VBUS, to ramp down as a function of the speed of the polyphase motor 18 as in the prior art, see FIG. 2.) Thus, the control circuit 104 is capable of maintaining synchronization with the rotor position of the polyphase motor 18 even though power has been interrupted.

To achieve the boost function, the commutation circuit 116 is preferably operable to circulate the currents flowing into and out of the polyphase motor 18 such that a net accumulation of charge may be obtained and stored for use in producing the secondary DC source. More particularly, the commutation circuit 116 is preferably operable to: (i) provide respective paths for current to flow between pairs of the windings of the polyphase motor 18 such that the current ramps up during some periods of time; and (ii) interrupt these respective paths for current and provide other respective paths for the current to flow between the pairs of the windings of the polyphase motor 18 such that the current ramps down during other periods of time.

Further details of providing and interrupting these current paths will be discussed in greater detail hereinbelow. At this point, however, it is noted that the provision and interruption of these current paths are preferably carried out by way of a plurality of commutation switching elements. These commutation switching elements may be entirely contained within the commutation circuit 116, i.e., they may be separate from the driver circuit 16. Alternatively, the commutation switching elements may be partially contained within the commutation circuit 116, i.e., at least some elements of the driver circuit 16 may be utilized as the commutation switching elements. Still further, the commutation switching elements might not be contained in the commutation circuit 116 at all, i.e., all the commutation switching elements may be contained within the driver circuit 16. In at least the latter case, the commutation circuit 116 preferably provides control signaling to the commutation switching elements within the driver circuit 16 by way of line 116A.

Further details concerning one embodiment of the commutation circuit 116 will now be described with reference to FIG. 5, which is a block diagram illustrating an example of a system 150 suitable for carrying out one or more aspects of the present invention. In this example, the switch 102 is preferably implemented utilizing a diode, which prohibits current to flow back into the DC source 12 during a power interrupt condition. The voltage sensing circuit 112 monitors the voltage level of the DC source 12 via line 112A and provides signaling indicating a loss of power condition to the voltage regulation and control circuit 114 by way of line 112B. The voltage regulation and control circuit 114 monitors the voltage level of the secondary DC source, which in this example is the voltage level of the operating DC voltage VCC and the DC bus voltage VBUS. It is noted that this is the same voltage across a bulk capacitance, C, which is typically present to provide local energy storage for the driver circuit 16 (and/or other circuits).

The driver circuit 16 includes respective pairs of high-side and low-side switches 16A–16B, 16C–16D, and 16E–16F. Each switch 16A–F includes an anti-parallel diode thereacross. The respective pairs of switches 16A–16B, 16C–16D, and 16E–16F are coupled in series across the DC bus VBUS and coupled at respective intermediate nodes A, B, and C to the windings of the polyphase motor 18.

The system 150 includes a torque control circuit 120 operable to produce signaling on line 120A, which the control circuit 104 uses to cause the polyphase motor 18 to produce a level of torque that is a function of a torque command, Tin. More particularly, the torque control circuit 120 employs a hysteretic current mode technique, whereby an aggregate offset current level and a ripple current of the windings of the polyphase motor 18 are sensed by way of a current sensing circuit 126. The offset current level is used to ensure that the polyphase motor 18 is producing the commanded torque. The ripple current is used to provide timing information to the control circuit 104 such that it produces the requisite commutation signaling to the switches 16A–F of the driver circuit 16. These and other operational details of the torque control circuit 120 may be found in U.S. Pat. No. 6,342,769, the entire disclosure of which is hereby incorporated by reference.

In this illustrative embodiment, the commutation circuit 116 includes some of the commutation switching elements for providing the current paths for boosting the BEMF voltages of the polyphase motor 18. The driver circuit 16 includes other commutation switching elements to provide such current paths. More particularly, the commutation circuit 116 preferably includes respective diodes 124, each having an anode coupled to one of the intermediate nodes A, B, and C, and having a cathode coupled to the common node (e.g., ground) of the low-side switches 16B, 16D, and 16F through a switch 122. The diodes 124, the switch 122, and the anti-parallel diodes of the driver circuit 16, when properly controlled, provide the current paths for boosting the BEMF voltages of the polyphase motor 18 to produce the secondary DC source.

A detailed discussion of the operation of the system 150 under power interruption conditions will now be provided. The voltage sensing circuit 112 determines that a power interruption has occurred, and places the system 150 into a regenerative mode. To this end, the voltage regulation and control circuit 114 provides a signal on line 114A to the torque control circuit 120 that reverses the polarity of the commanded torque. In general, to maintain synchronization, the commutation of the windings of the polyphase motor 18 must be such that the boosted BEMF voltages are sufficiently high to both provide the operating DC voltage, VCC, to the control circuit 104, and to be sensed by the control circuit 104.

An example of how the windings of the polyphase motor 18 may be commutated to convert the kinetic energy of the motor 18 (and/or load) into the secondary DC source will now be discussed. This example is given by way of illustration and not by way of limitation. Indeed, as discussed later in this specification, other examples exist and are contemplated by the invention. When in the regenerative mode, currents are ramped-up in the polyphase motor 18 by shorting the windings together for a period of time and then removing the shorting condition and permitting the current to circulate through the bulk storage capacitor C in a controlled manner. For example, when the torque control circuit 120 senses that the ripple current (as monitored by the current sensing circuit 126) has fallen to a sufficiently low level, the switch 122 will be turned on by way of signaling over line 120B. This places the cathodes of the diodes 124 substantially at ground potential and permits current flow from one of the windings of the polyphase motor 18 having a highest voltage potential to one of the windings having a lowest voltage potential.

By way of example, it is assumed that the winding having the highest potential is coupled to node C and the winding having the lowest potential is coupled to node B. Thus, current will flow from node C through the associated diode 124, through the switch 122, through the current sensing circuit 126, through the anti-parallel diode of switch 16D, to node B. It is noted that this current path provides for current flow between the pairs of windings associated with nodes B and C, but bypasses the secondary DC source. In other words, the flowing current does not place any charge on the bulk storage capacitor C, nor does it source current into the control circuit 104 to provide operating DC voltage thereto. The current in this path, however, ramps-up and eventually reaches a level at which the torque control circuit 120 turns off the switch 122 by way of line 120B.

When the switch 122 is turned off, the existing current path is interrupted and the voltages induced in the windings of the polyphase motor 18 reverse. The current flow in these windings, however, continues to flow by way of another current path. In accordance with at least one aspect of the present invention, the path between the windings associated with nodes B and C during this time interval permits current to flow to the secondary DC source. In particular, current flows from node C, through the anti-parallel diode associated with switch 16E through the bulk storage capacitor C into ground, through the current sensing circuit 126, through the anti-parallel diode associated with switch 16D, and to node B. During this time interval, voltages induced in the windings of the polyphase motor 18 are additive with the BEMF voltages, thereby providing a boost, and charge is delivered to the secondary DC source, e.g., the charge on the bulk capacitor C increases.

While two current paths have been discussed in the above example, one skilled in the art will appreciate from the description herein that other combinations of current paths will exist at subsequent time intervals depending on the polarities and magnitudes of the voltages of the windings of the polyphase motor 18. All the while, the voltage regulation and control circuit 114 will adjust the commanded regeneration torque by way of line 114A such that the voltage level of the secondary DC source (e.g., the voltage across the bulk capacitance C) is maintained at a desired level, such as 15 volts (FIG. 4).

Figure 5:
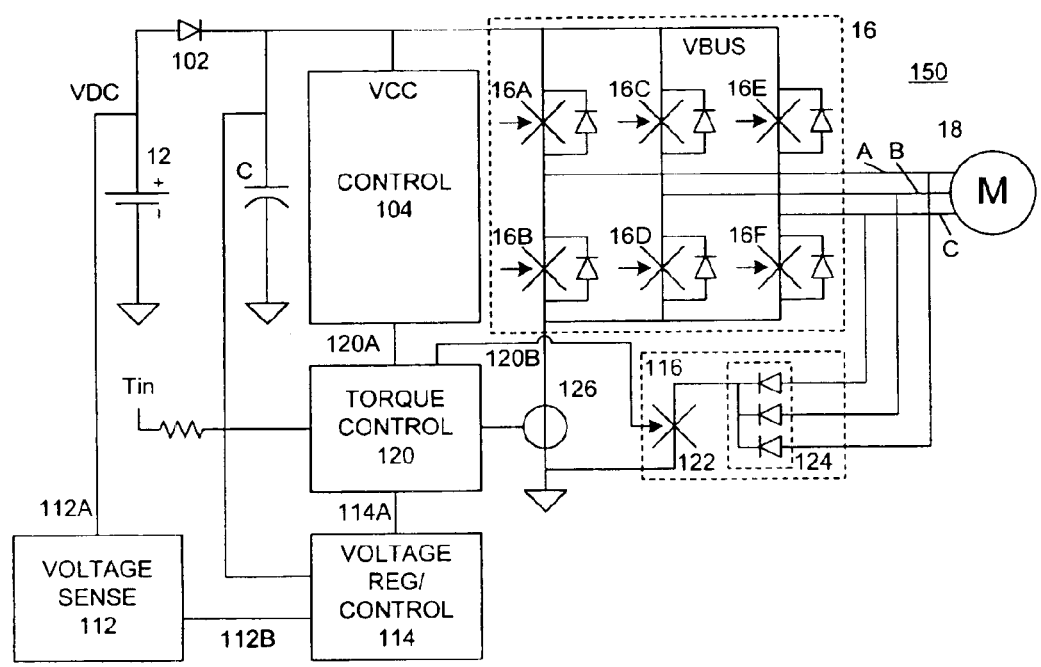
FIG. 5 is a block diagram illustrating an alternative system for controlling and driving a polyphase motor in accordance with one or more further aspects of the present invention.
Figure 6:
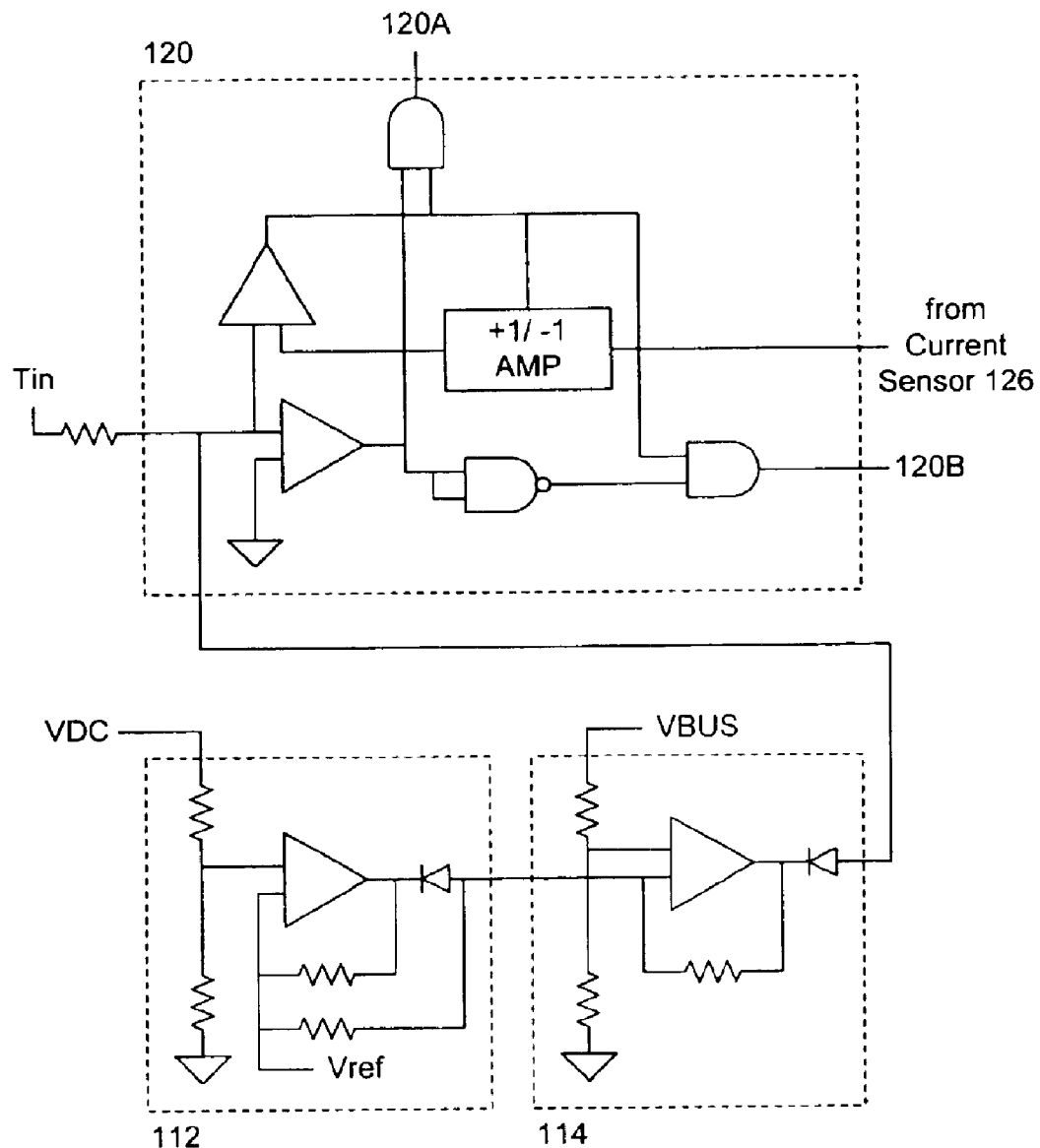
FIG. 6 is an example of a more detailed circuit implementation of certain portions of the system of FIG. 5.

With reference to FIG. 6, more detailed circuit diagrams are shown that are suitable for implementing the voltage sensing circuit 112, the voltage regulation and control circuit 114, and the torque control circuit 120 of FIG. 5. As the operation of these circuits will be readily apparent to one skilled in the art from the description herein, for the purposes of brevity a detailed discussion of same is omitted.

Figure 7:
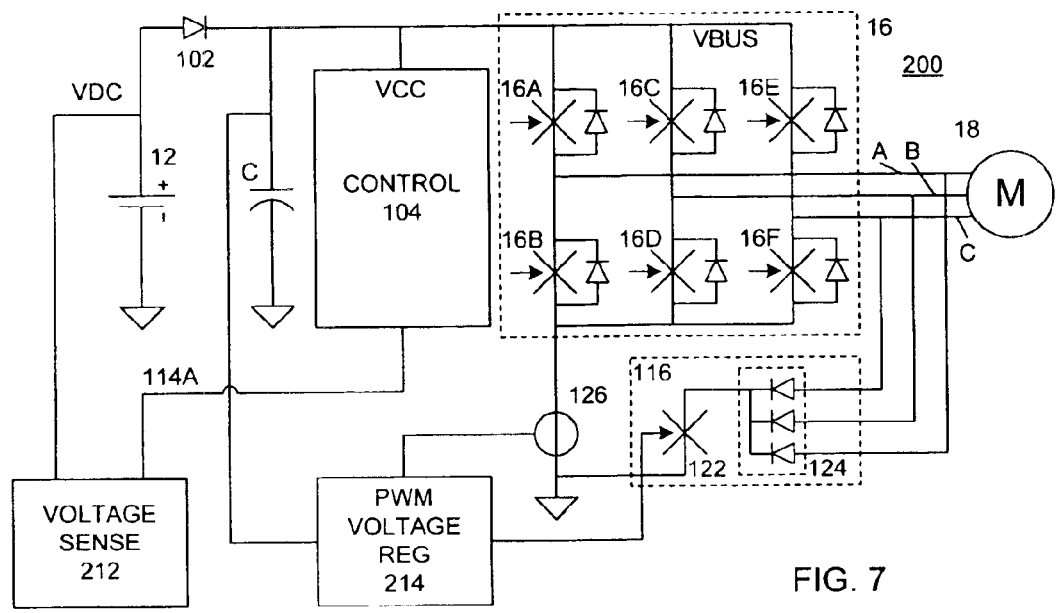
FIG. 7 is a block diagram of a further alternative system for controlling and driving a polyphase motor in accordance with one or more further aspects of the present invention.

Reference is now made to FIG. 7, which illustrates an alternative system 200 that is suitable for carrying out one or more further aspects of the present invention. In the system 200, the voltage regulation function is carried out by a pulse width modulation (PWM) voltage regulation circuit 214. While a hysteretic torque control circuit similar to that of FIG. 5 may be employed in the system 200, it is not utilized in the regulation of the secondary DC source during a power interrupt. Rather, the separate PWM voltage regulation circuit 214 operates to control the switch 122 in order to regulate the voltage of the secondary DC source. The advantage of this approach is that the PWM voltage regulation circuit 214 may be programmed to operate at a substantially higher frequency than, for example, the hysteretic torque control circuit 120 (FIG. 5) and, therefore, the current ripple in the system 200 may be reduced. In the system 200 of FIG. 7, the voltage sensing circuit 212 provides a disable signal to the control circuit 104 by way of line 114A during the power interrupt condition. In other ways, the operation of the system 200 is similar to the system 150 discussed hereinabove with respect to FIG. 5.

Figure 8:
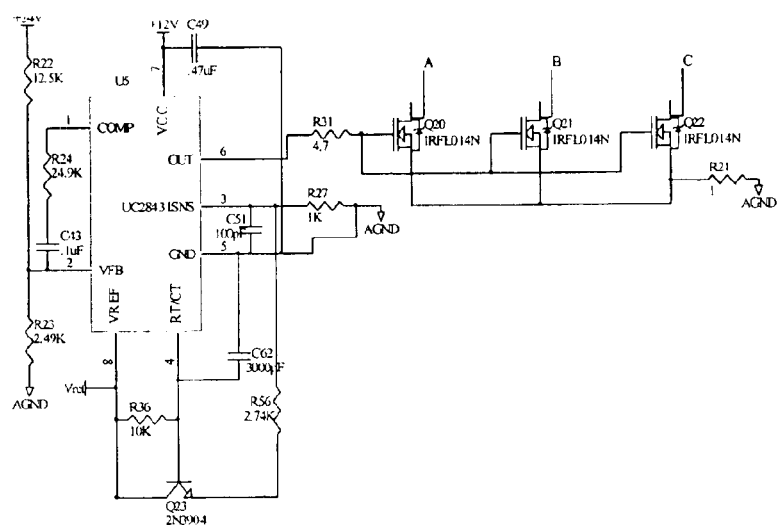
FIG. 8 is an example of a more detailed implementation of certain portions of the system of FIG. 7.

With reference to FIG. 8, an example of a more detailed circuit implementation of the PWM voltage regulation circuit 214 is provided. It is understood, however, that the regulation circuit 214 may be implemented in many different ways without departing from the spirit and scope of the invention as claimed. As the detailed operation of the circuit illustrated in FIG. 8 will be apparent to one skilled in the art, for the purposes of brevity a detailed description thereof is omitted. It is noted, however, that an alternative implementation of the commutation switching elements of the commutation circuit 116 is employed as compared with the system 150 of FIG. 5. In particular, the three diodes 124 and the switch 122 have been replaced with three N-channel field effect transistors (FETs), which are controlled to perform the same function.

It is noted that the specific circuit implementation of the commutation circuit 116 may take on many forms and, indeed, are too numerous to reproduce in this description without sacrificing practicality, brevity, and clarity. By way of further example, however, it is noted that the low-side switches 16B, 16D, and 16F of the driver circuit 16 may be turned on in order to short the windings of the polyphase motor 18 together and provide paths for the currents to ramp-up in the polyphase motor 18. In this way, neither the diodes 124 nor the switch 122 need be provided; however, appropriate control signaling must issue from the commutation circuit 116 (or any other appropriate circuit) to turn on and to turn off such switches at the appropriate times. This is illustrated by way of line 116A in FIG. 3. It is noted, however, that without the additional switching components of the commutation circuit 116, e.g., the diodes 124 and the switch 122, the current would not flow through the current sensing circuit 126. Thus, an open-loop voltage regulation technique and/or pure voltage mode control might be required to regulate the secondary DC source. Alternatively, separate current sensors could be utilized to monitor the current flowing in each of the low-side switches 16B, 16D, 16F (and the associated anti-parallel diodes) in order to sense the current flow and enable the use of current mode regulation techniques.

In yet another example, the commutation circuit 116 may be implemented such that any two or more of the high-side switches 16A, 16C and 16E are turned on to ramp-up the current in the polyphase motor 18. Again, in this example, neither the diodes 124 nor the switch 122 need be provided; however, appropriate control signaling must issue from the commutation circuit 116 (or any other appropriate circuit) to turn on and to turn off such switches at the appropriate times. This technique is also characterized in that the current would not flow through the current sensing circuit 126 and, therefore, as discussed in the previous example, an open-loop voltage regulation technique and/or pure voltage mode control might be necessary to regulate the secondary DC source. Alternatively, separate current sensors could also be utilized to monitor the current flowing in each of the high-side switches 16A, 16C, 16E (and the associated anti-parallel diodes) in order to sense the current flow and enable the use of current mode regulation techniques.

In still another example, the commutation circuit 116 may be implemented such that one of the high-side switches 16A, 16C, 16E and one of the low-side switches 16B, 16D, 16F are turned on in a manner where the DC bus voltage aids the BEMF voltage to ramp-up the current in the polyphase motor 18 during some periods of time. Thus, some charge is drawn from the bulk capacitor C during these time periods. During other periods of time, however, all switches 16A-16F are turned off such that the current circulates through respective pairs of the anti-parallel diodes and places charge on the bulk capacitor C. This technique would likely be suitable when the polyphase motor 18 is an induction machine.

Figure 9:
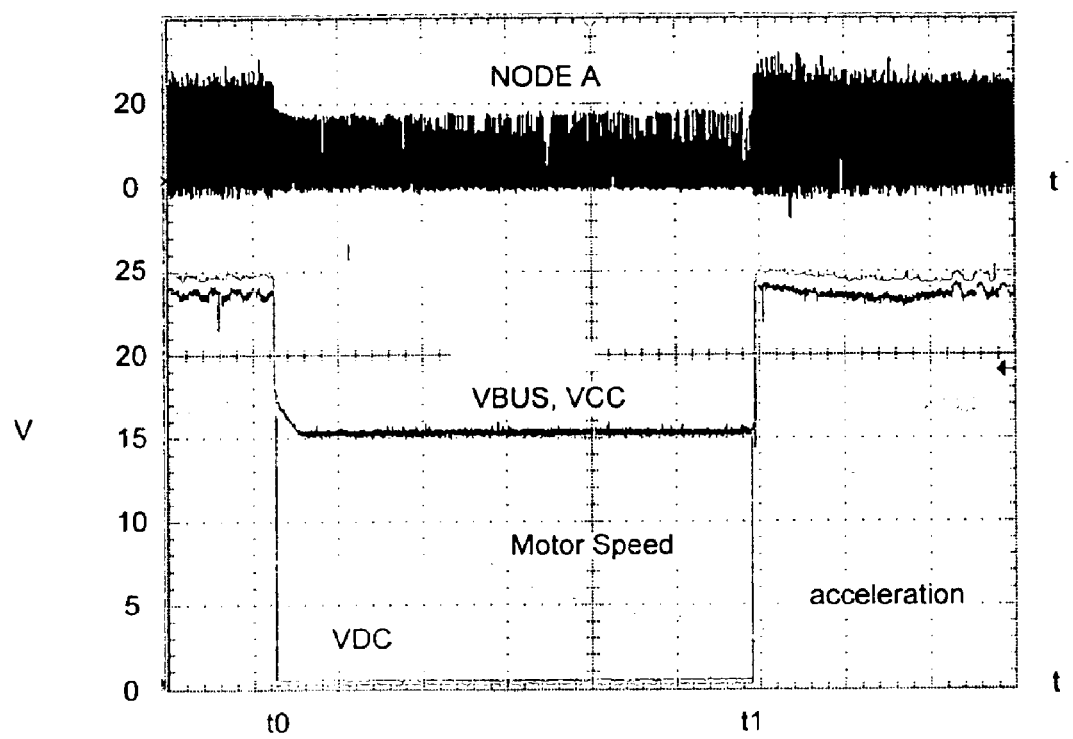
FIG. 9 is a graphical representation of certain signals and conditions of the system of FIG. 7 under power interrupt and power reacquisition conditions.

With reference to FIG. 9, and in accordance with one or more further aspects of the present invention, the systems 100, 150, and 200 discussed hereinabove with respect to FIGS. 3, 5, and 7 are preferably operable to permit the control circuit 104 to maintain synchronization with the rotor position of the polyphase motor 18 during the power interrupt and substantially instantaneously accelerate the polyphase motor 18 when power is reacquired. More particularly, FIG. 9 graphically illustrates the voltage level of the DC source, VDC, the voltage of node A, the speed of the polyphase motor 18, and the voltage level of the secondary DC source (e.g., VBUS). At time t0 the voltage level of the DC source 12 falls to zero and the speed of the polyphase motor 18 ramps down. The power interrupt circuit 110 operates to convert the kinetic energy of the rotating polyphase motor 18 into the secondary DC source of voltage, and to regulate such voltage to a level sufficient to permit the control circuit 104 to maintain synchronization with the rotor of the polyphase motor 18. At time t1, the voltage level of the DC source 12 is reacquired and the power interrupt circuit 110 enables the control circuit 104 to resume normal operation. Advantageously, however, the control circuit 104 need not reacquire synchronization with the rotor of the polyphase motor 18 because the control circuit 104 never lost synchronization during the power interrupt. Consequently, the polyphase motor 18 may be substantially immediately re-accelerated to the desired speed and/or torque.

It is noted that the methods and apparatus for maintaining synchronization between the control circuit 104 and the rotor of the polyphase motor 18 described hereinabove may be achieved utilizing suitable hardware, such as that shown in the drawings. It is noted that such hardware may be implemented utilizing any of the known technologies, such as standard digital circuits, analog circuits, any of the known processors that are operable to execute software and/or firmware programs, one or more programmable digital devices or systems, such as programmable read only memories (PROMs), programmable array logic devices (PALs), any combination of the above, etc. Indeed, while various circuit implementations of the embodiments of the present invention may have advantages and disadvantages, they are all within the spirit and scope of the invention as claimed.

Further, although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method, comprising:
monitoring a level of a power source that provides operating power to a control circuit, the control circuit being of a type that senses signals in windings of a polyphase motor to maintain synchronization therewith; and converting kinetic energy of the polyphase motor into operating power for the control circuit when the level has fallen below a threshold level, such that the control circuit is capable of maintaining synchronization with the polyphase motor.

2. The method of claim 1, wherein the signals in the windings of the polyphase motor are back electromotive force (BEMF) signals that are used by the control circuit to determine a rotor position of the polyphase motor.

3. The method of claim 2, further comprising using the BEMF voltage to produce the operating power for the control circuit.

4. The method of claim 3, further comprising boosting the BEMF voltage to produce the operating power for the control circuit.

5. The method of claim 1, wherein the control circuit is operable to provide commutation signals to a driver circuit for commutating the windings of the polyphase motor such that it produces motoring torque during a motoring mode, the method further comprising: inhibiting the motoring commutation control signals to the driver circuit in order to convert the kinetic energy of the polyphase motor into operating power for the control circuit.

6. The method of claim 5, further comprising enabling the motoring commutation control signals to the driver circuit when the level rises sufficiently with respect to the threshold, wherein the step of enabling may be carried out without first stopping and restarting the polyphase motor.

7. An apparatus, comprising:

a voltage sensing circuit operable to monitor a level of a power source that provides operating power to a control circuit, the control circuit being of a type that senses signals in windings of a polyphase motor to maintain synchronization therewith; and a power conditioning circuit operable to convert kinetic energy of the polyphase motor into operating power for the control circuit when the level has fallen below a threshold level, such that the control circuit is capable of maintaining synchronization with the polyphase motor.

8. The apparatus of claim 7, wherein the signals in the windings of the polyphase motor are back electromotive force (BEMF) signals that are used by the control circuit to determine a rotor position of the polyphase motor.

9. The apparatus of claim 8, wherein the power conditioning circuit is operable to use the BEMF voltage to produce the operating power for the control circuit.

10. The apparatus of claim 8, wherein the power conditioning circuit is operable to boost the BEMF voltage to produce the operating power for the control circuit.

11. The apparatus of claim 10, further comprising a voltage regulator circuit operable to provide signaling to the power conditioning circuit to regulate the operating power to the control circuit such that the control circuit is capable of maintaining synchronization with the polyphase motor.

12. The apparatus of claim 11, wherein the control circuit is operable to provide commutation signals to a driver circuit for commutating the windings of the polyphase motor such that it produces motoring torque during a motoring mode.

13. The apparatus of claim 12, wherein at least one of the voltage sensing circuit and the power conditioning circuit is operable to inhibit the commutation control signals to the driver circuit in order to convert the kinetic energy of the polyphase motor into operating power for the control circuit.

14. The apparatus of claim 13, wherein at least one of the voltage sensing circuit and the power conditioning circuit is operable to enable the commutation control signals to the driver circuit when the level rises sufficiently with respect to the threshold, and such that the enabling may be carried out without first stopping and restarting the polyphase motor.

* * * * *